UNITED STATES PATENT OFFICE.

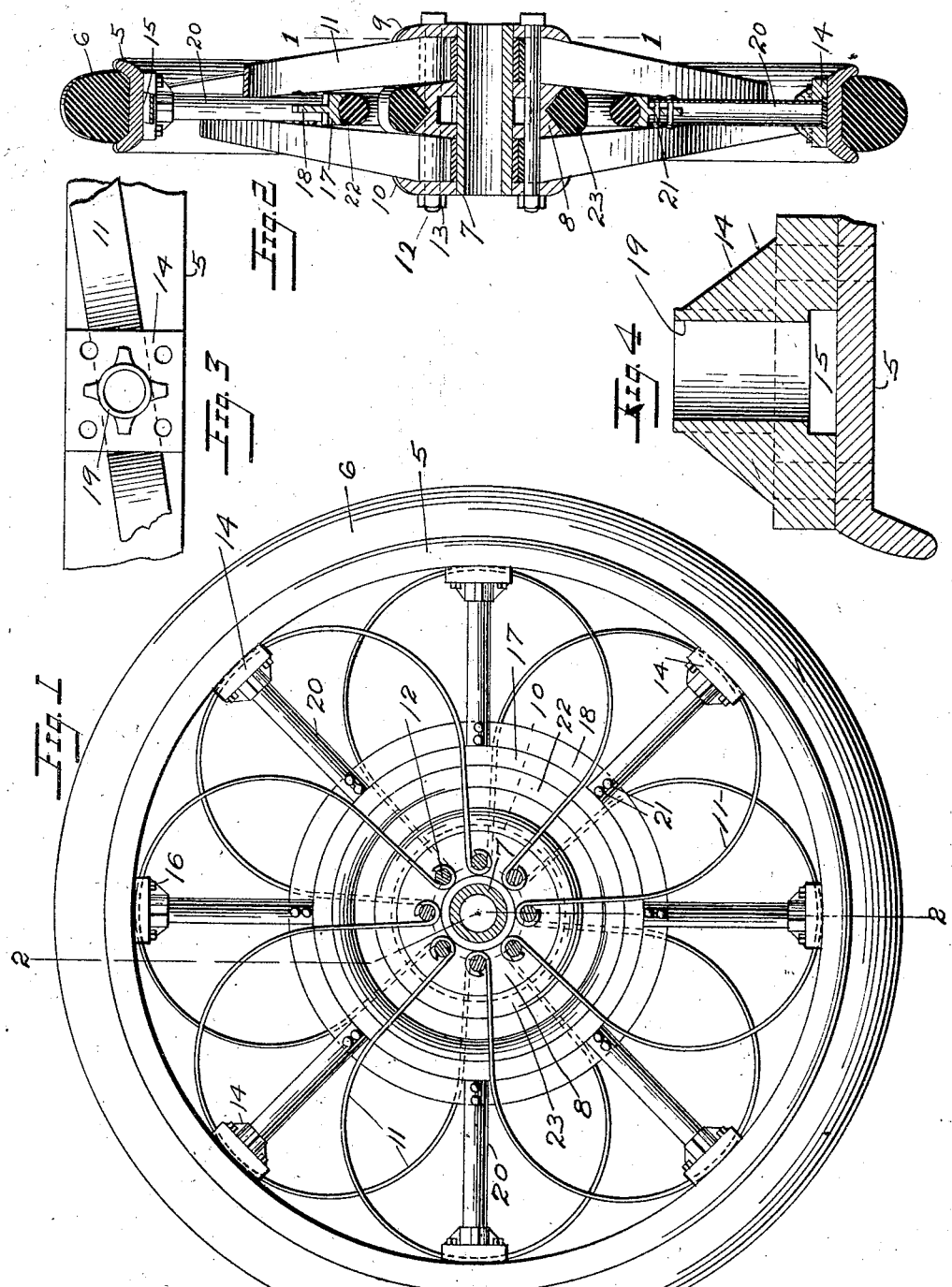

CHARLES W. STAPLETON, OF NEW YORK, N. Y.

VEHICLE-WHEEL.

No. 874,708.     Specification of Letters Patent.     Patented Dec. 24, 1907.

Application filed October 7, 1905. Serial No. 281,822.

*To all whom it may concern:*

Be it known that I, CHARLES W. STAPLETON, a citizen of the United States, residing in New York, in the county and State of New York, have invented certain new and useful Improvements in Vehicle-Wheels, of which the following is a specification.

The invention relates to elastic spring wheels, the object being to provide a wheel which shall intercept and absorb the shocks, jolts and knocks incident to use, thus relieving the axletree and all other parts of the vehicle.

I provide a wheel with metallic spring spokes, firmly attached to and radiating from the hub, of curvilinear form, firmly attached to the felly. To the felly may be added the ordinary rubber tire. The spring spokes have a broader base seat, or place of attachment at the hub than at the felly, thus giving them an inclined and bracing position the better to enable the wheel to withstand lateral thrusts and strains and to avoid "dishing." Rigidly attached to, and projecting from the felly are independent, non-flexible spokes, radiating toward the hub of the wheel and carrying an interior buffer ring entirely dependent for support on its attachment to the felly, and subject only to the motion of the felly. Within this interior buffer ring I provide a buffer collar encircling the hub and attached thereto, wholly dependent on and moving in conjunction with said hub. This buffer ring and collar are equipped with india rubber. This arrangement permits the hub to move freely at all times within the interior buffer ring in response to shocks and the load, thus producing the combination of a wheel rigid laterally but flexible circumferentially, with the functions of a rubber tired wheel, and the ordinary wagon spring.

My invention is illustrated in the accompanying drawing, in which—

Figure 1. is a side elevation of a vehicle wheel constructed according to my invention, with one of the hub flanges removed, the view being taken on the line 1—1 of Fig. 2.; Fig. 2. is a vertical section on the irregular line 2—2 of Fig. 1.; Fig. 3. is a plan view of a clamp for a spoke on the felly; and, Fig. 4. is a vertical section of a portion of the same on an enlarged scale.

In the accompanying drawing like numerals of reference refer to the same parts in each of the views; and in practice I provide a vehicle wheel with a suitable felly, which may consist of a flanged channel (5), in which may be seated a solid rubber tire (6). I also provide a hub (7), which is particularly shown in Fig. 2, and consists of a journal box on which is secured in any desired manner, but preferably by shrinking thereon, a collar (8), forming a buffer seat, which is mounted centrally with reference to said journal box. On each of the ends of this journal box I mount flanged plates (9 and 10). I also provide spring spokes (11), of peculiar construction, each comprising a steel band bent to form a loop, as shown in Fig. 1., one end being located on one side of the collar (8), and the other end being on the opposite side of said collar. The ends of these spring spokes are bent to form a hook or eye; and I provide bolts (12), which pass through the plates 9 and 10, and through the collar and through the eye formed in the end of one spring spoke and the eye of the spring spoke on the opposite side of the collar; and the spokes (11), are so proportioned in width that when the nuts 13 on the bolts (12), are screwed up tight the edges of the ends of the spring spokes, the collar (8), and the plates (9 and 10) are fastened and held firmly together, as clearly shown in Fig. 2; the plates (9 and 10) are made slightly dish-shaped to conform to the inward incline of the spring spokes. On the underside of the felly (5), I secure at fixed intervals rigid spokes converging toward the hub and attached by clamps (14). By securing these clamps to the felly by bolts (16), it will be seen that the central portion of the spring spokes is clamped to the felly, while the ends are fastened by the bolts (12), so that the felly of the wheel is secured to the hub solely by these spring spokes, which are composed of spring metal of sufficient width and rigidity, and at the same time yield sufficiently, to relieve the vehicle from shock when striking an object, or in passing over rough roads. In order that these springs may have sufficient elasticity but without too much spring action, under unusual shock, I provide an interior buffer, comprising a ring 17, having a flange 18, and each clamp 14, is provided with a socket 19, in which is mounted one end of a rigid spoke 20, the opposite end of which is attached to the buffer ring 17, which is secured thereto by rivets 21, or in any desired manner. On this buffer ring is mounted a rubber ring 22, and in the collar 8, is mounted a rubber ring 23, forming buffers which are held at a fixed distance apart so as to allow of a limited spring action of the spokes 11, before contact; but should this spring action be increased beyond the point desired, the buffers 22 and 23, would contact with each other and prevent undue depression of the spring spokes 11, and these buffers being composed of rubber, would relieve the shock so that no resultant jolt would be felt in the vehicle.

While the buffer ring 17, and the spokes 20, together with the sockets of the felly are designed specifically to form with the collar 8, and buffer 23, means to limit the movement of the spring spokes in their spring action, these spring spokes give sufficient lateral rigidity to the wheel. The ring 17, is supported intermediately between the ends of the spoke and the felly of the wheel, and passes between the ends of each spoke, one end being on one side of this ring, and the other end being on the opposite side, as clearly shown in the drawings.

It will be readily seen that a wheel constructed as I have described will have the elastic function of the rubber tires and numerous sensitive springs acting conjointly, while the interior buffers allow of the spring spokes being made of considerable elasticity, without danger of a too great flexing.

I do not limit myself to the construction shown in the accompanying drawing as it is plain that the spring spokes may be arranged in various ways; I may divide them, confining them to a semicircle, or segment of a circle, and may have them all curve in one direction, and instead of a set of opposite spokes, there may be but a single series; or they may be reversed, and the ends attached to the felly instead of the hub, and various methods of attaching the spokes to the felly and to the hub may be used, as will be suggested to the ordinary mechanic.

While I prefer to separate the buffer rings, it is plain that they may be adjusted to contact at all times and that only one rubber buffer ring need be used, and that these buffers may be equipped with either solid or pneumatic rubber.

Having thus described my invention, what I claim as new, and desire to secure by Letters Patent is—

1. A vehicle wheel having elastic spokes, and a buffer interposed between the ends of said spokes adapted to limit the action of the same.

2. A vehicle wheel having a plurality of spokes composed of spring metal, and a buffer interposed between the ends of said spokes adapted to limit both the vertical and lateral action of the same.

3. In a vehicle wheel, a plurality of spokes composed of spring metal curvilinear in form, extending between and connecting the hub and felly, and a buffer interposed between said spokes thereby limiting the spring action of the same.

4. In a vehicle wheel, a plurality of spokes curvilinear in form composed of spring metal extending between and connecting the hub with the felly, and a buffer mounted between the ends of said spokes intermediately between the hub and the felly, as and for the purpose set forth.

5. In a vehicle wheel a pluralty of spokes composed of spring metal, curvilinear in form, having both ends thereof secured in the hub, said spokes overlapping each other and the ends thereof being on opposite ends of said hub, and a buffer intermediate between the hub and the felly.

6. In a vehicle wheel having spokes composed of spring metal extending from the felly to the hub, a buffer comprising a collar secured to the hub between said spokes, a ring of greater diameter encircling the same, whereby an annular space is left between the ring and the collar, means to hold said ring in position, and an elastic cushion mounted on one of said members adapted to impinge upon the other member, thereby limiting the spring action of said spokes, and absorbing the shocks, as and for the purpose set forth.

7. In a vehicle tire having spokes composed of spring metal a buffer comprising a collar secured centrally with reference to the hub, a ring of greater diameter secured to the felly of the wheel with rigid spokes, and an elastic cushion mounted between said ring and collar, as and for the purpose set forth.

8. A vehicle wheel comprising a felly having a rubber tire mounted thereon, a plurality of loop-shaped spring spokes, the ends of each of which are secured in the opposite ends of the hub of the wheel, said spokes overlapping each other, a collar secured to said hub intermediately between the ends thereof and between the opposite ends of said spokes, a cushion on said collar, a ring held between said collar and the felly of the wheel by rigid spokes, said ring being interposed between the opposite ends of each of said spokes and being adapted to limit the movement of said spokes, as and for the purpose set forth.

9. The herein described vehicle wheel comprising a felly, a rubber tire secured thereon, a hub, a plurality of curvilinear spokes composed of spring metal, the ends of which are secured in the opposite ends of said hub, a collar on the said hub between the opposite ends of said spokes, flanges and bolts to clamp the ends of said spokes in position against said collar, a plurality of rigid spokes attached to the felly, supporting a ring on their converging ends at a fixed distance from said collar, and elastic material mounted between said ring and said collar, as and for the purpose set forth.

10. In a vehicle wheel, the combination of curvilinear metallic, flexible spokes, radiating from and firmly connecting the hub with the felly, an interior buffer ring, suspended from and rigidly attached to the inner part of the felly; an interior buffer collar within said interior buffer ring, said collar encircling and rigidly attached to the outer part of the hub, said collar and buffer ring being on a vertical plane with the wheel felly, and adjusted to impinge upon or contact with each other when the hub in use, upon the flexing of the springs, moves out of the center of the wheel.

In testimony whereof I have signed my name to this specification in the presence of two subscribing witnesses.

CHARLES W. STAPLETON.

Witnesses:
ADELE V. JUILLERAT,
FREDERICK B. CUTLER.